US009959603B2

(12) United States Patent
Xu et al.

(10) Patent No.: US 9,959,603 B2
(45) Date of Patent: May 1, 2018

(54) METHOD AND DEVICE FOR IMAGE PROCESSING

(71) Applicant: BEIJING KINGSOFT NETWORK TECHNOLOGY CO., LTD., Beijing (CN)

(72) Inventors: Guangsheng Xu, Beijing (CN); Jian Ma, Beijing (CN); Dingpan Li, Beijing (CN)

(73) Assignee: Beijing Cheetah Network Technology Co., Ltd., Beijing (CN)

( * ) Notice: Subject to any disclaimer, the term of this patent is extended or adjusted under 35 U.S.C. 154(b) by 135 days.

(21) Appl. No.: 14/905,762

(22) PCT Filed: Aug. 29, 2014

(86) PCT No.: PCT/CN2014/085482
§ 371 (c)(1),
(2) Date: Jan. 15, 2016

(87) PCT Pub. No.: WO2015/149475
PCT Pub. Date: Oct. 8, 2015

(65) Prior Publication Data
US 2016/0163028 A1    Jun. 9, 2016

(30) Foreign Application Priority Data

Apr. 4, 2014  (CN) .......................... 2014 1 0137069

(51) Int. Cl.
*G06K 9/00* (2006.01)
*G06T 5/00* (2006.01)
(Continued)

(52) U.S. Cl.
CPC .......... *G06T 5/005* (2013.01); *G06K 9/00234* (2013.01); *G06K 9/4633* (2013.01);
(Continued)

(58) Field of Classification Search
None
See application file for complete search history.

(56) References Cited

U.S. PATENT DOCUMENTS 8,265,410 B1 * 9/2012 Konoplev .......... G06K 9/00228
382/118

FOREIGN PATENT DOCUMENTS

CN        101916370        12/2010
CN        103268475        8/2013
(Continued)

OTHER PUBLICATIONS

International Search Report for Application No. PCT/CN2014/085482, dated Dec. 31, 2014.

*Primary Examiner* — Fred Hu
(74) *Attorney, Agent, or Firm* — Squire Patton Boggs (US) LLP

(57) ABSTRACT

The present application discloses a method and a device for image processing. The method comprises: performing facial recognition on an image to be processed; determining a skin area to be processed in a facial area according to detection results; determining the locations of skin blemishes in the skin area to be processed; removing the skin blemishes in the facial area according to the determined locations of the skin blemishes in the skin area to be processed to obtain a processed image. The method and the device for image processing can modify people's skin in an image automatically, that is to say, both light-colored blemishes and obvious problems on the skin are removed. In contrast to the solutions for removing skin blemishes manually in various existing APPs for skin beautification, the method provided by the present application provides a better experience for users.

16 Claims, 6 Drawing Sheets

(51) Int. Cl.
*G06K 9/46* (2006.01)
*G06T 3/40* (2006.01)
*G06T 7/90* (2017.01)

(52) U.S. Cl.
CPC .............. *G06K 9/4652* (2013.01); *G06T 3/40* (2013.01); *G06T 5/007* (2013.01); *G06T 7/90* (2017.01); *G06T 2207/10024* (2013.01); *G06T 2207/30201* (2013.01)

(56) References Cited

FOREIGN PATENT DOCUMENTS

| | | |
|---|---|---|
| CN | 103927718 | 7/2014 |
| CN | 103927719 | 7/2014 |

* cited by examiner

METHOD AND DEVICE FOR IMAGE PROCESSING

The present application claims the benefit of priority to Chinese Patent Application No. 201410137069.9, filed on Apr. 4, 2014, and entitled "Method and Device for Image Processing", which is hereby incorporated into the present application by reference in its entirety.

TECHNICAL FIELD

The present application relates to the field of image processing technology, and in particular to a method and device for image processing.

BACKGROUND ART

Cameras have been widely used in people's daily life, and there is an increasing need for modifying photographic images. In prior art, "Dermabrasion" technology is generally used to modify people's facial skin on photos. After using such function, rough portions of facial skin will become smooth, and light-colored spots will disappear. That is to say, smaller, dark-colored portions on facial skin will become light-colored, which seem disappeared visually. However, more obvious facial skin problems such as acnes, scars or the like may still leave distinct marks. In order to solve this problem, existing applications generally require users to specify the locations and sizes of the blemishes on facial skin manually. Then according to the specified locations and sizes, the color of the corresponding areas is replaced with color that is close to the color of the surrounding skin, and thereby the objective to modify the image and to remove the blemishes is achieved.

It can be seen that in existing process of image processing, automatic computer processing can only remove light-colored blemishes such as light-colored pimples, blackspots and leave relatively obvious facial skin problems such as acnes, scars or the like unremoved. Even if these problems can be processed, distinct marks may be left after processing. Therefore, these relatively obvious facial skin problems can only be removed manually, which is a tedious work and also a demanding job for users. Only the users with skills can remove the relatively obvious facial skin problems manually, while ordinary users cannot.

SUMMARY OF INVENTION

An objective of the embodiments of the present application is to provide a method and device for image processing, in order to modify people's facial skin on photos automatically and thereby to remove the relatively obvious problems in facial skin.

In order to achieve the objective described above, the present application discloses a method for image processing, comprising:

performing facial recognition on an image to be processed;

determining a skin area to be processed in a facial area according to detection results;

determining the locations of skin blemishes in the skin area to be processed;

removing the skin blemishes in the facial area according to the determined locations of the skin blemishes in the skin area to be processed to obtain a processed image.

Preferably, said determining a skin area to be processed in a facial area comprises:

detecting covered areas in the facial area;

determining a non-covered area in the facial area according to the covered areas;

detecting the skin area in the non-covered area;

or detecting the skin area in the facial area.

Preferably, the image to be processed comprises:

an original image to be processed or an image obtained by scaling up/down the original image to be processed according to a first preset scale.

Preferably, said determining the locations of skin blemishes in the skin area to be processed comprises:

obtaining images with different levels of blemish conspicuousness for the skin area to be processed;

determining color values of the skin area to be processed and generating a skin similarity image for the skin area to be processed according to the color values;

determining the locations of the skin blemishes in the skin area to be processed according to the images with different levels of blemish conspicuousness and the skin similarity image.

Preferably, said determining color values of the skin area to be processed and generating a skin similarity image of the skin area to be processed according to the color values comprises:

sampling the skin color value of a number of areas in the skin area to be processed respectively to obtain a number of sampling values for each area;

calculating a skin color value for each area according to the sampling values;

traversing pixels in each area respectively, and calculating a similarity value between the color value of each pixel and the skin color value of the area in which the pixel is located;

mapping the calculated similarity values into grayscale values to generate a skin similarity image reflecting skin color.

Preferably, said obtaining images with different levels of blemish conspicuousness for the skin area to be processed comprises:

generating a first image with a first black/white contrast;

generating a second image with a second black/white contrast; wherein the first black/white contrast is greater than the second black/white contrast;

generating a third image with a third black/white contrast; wherein the third black/white contrast is the same as the first black/white contrast;

said determining the locations of the skin blemishes in the skin area to be processed according to the images with different levels of blemish conspicuousness and the skin similarity image comprises:

determining the locations of the skin blemishes in the skin area to be processed according to the first, the second and the third images as well as the skin similarity image.

Preferably, said determining the locations of the skin blemishes in the skin area to be processed according to the first, the second and the third images as well as the skin similarity image comprises:

generating a first set of skin blemishes according to the second image and the skin similarity image;

generating a second set of skin blemishes according to the first image and the skin similarity image;

generating a third set of skin blemishes and a fourth set of skin blemishes according to the third image and the skin similarity image;

combining the first to fourth sets of skin blemishes together to obtain the locations of all the skin blemishes in the skin area to be processed.

Preferably, the step of determining the locations of the skin blemishes in the skin area to be processed according to the first, the second and the third images, as well as the skin similarity image comprises:

generating a first set of skin blemishes according to the second image, the skin similarity image and the skin area to be processed;

generating a second set of skin blemishes according to the first image, the skin similarity image and the skin area to be processed;

generating a third set of skin blemishes and a fourth set of skin blemishes according to the third image, the skin similarity image and the skin area to be processed;

combining the first to fourth sets of skin blemishes together to obtain the locations of all the skin blemishes in the skin area to be processed.

Preferably, the step of generating a first set of skin blemishes according to the second image, the skin similarity image and the skin area to be processed comprises:

searching for a patch that meets a first search criteria in the second image; wherein the first search criteria is that grayscale values of pixels thereof are smaller than or equal to a first grayscale threshold and that the number of pixels therein, which are adjacent to each other and whose grayscale values are smaller than or equal to the first grayscale threshold, is smaller than or equal to a first adjacency threshold;

mapping the location of the patch into the skin area to be processed and the skin similarity image;

extracting the location of the patch and color values of pixels corresponding to the patch from the skin area to be processed; if the color values are within a predetermined blemish color threshold range; then extracting grayscale values of the corresponding pixels within a predetermined range centered at the location of the patch from the skin similarity image, and judging whether the grayscale values are within a grayscale threshold range representing similar skin color;

if yes, taking one or more searched patches as the first set of skin blemishes.

Preferably, the step of generating a second set of skin blemishes according to the first image, the skin similarity image and the skin area to be processed comprises:

searching for a patch that meets a second search criteria in the first image; wherein the second search criteria is that grayscale values of pixels thereof are smaller than or equal to a second grayscale threshold and that the number of pixels therein, which are adjacent to each other and whose grayscale values are smaller than or equal to the second grayscale threshold, is smaller than or equal to a second adjacency threshold;

mapping the location of the patch into the skin area to be processed and the skin similarity image;

extracting the location of the patch and color values of pixels corresponding to the patch from the skin area to be processed; if the color values are within a predetermined blemish color threshold range; then extracting grayscale values of the corresponding pixels within a predetermined range centered at the location of the patch from the skin similarity image, and judging whether the grayscale values are within a grayscale threshold range representing similar skin color;

if yes, taking one or more searched patches as the second set of skin blemishes.

Preferably, the step of generating a third set of skin blemishes and a fourth set of skin blemishes according to the third image, the skin similarity image and the skin area to be processed comprises:

searching for a patch that meets a third search criteria in the third image; wherein the third search criteria is that grayscale values of pixels thereof are smaller than or equal to a third grayscale threshold and that the number of pixels therein, which are adjacent to each other and whose grayscale values are smaller than or equal to the third grayscale threshold, is smaller than or equal to a third adjacency threshold;

searching for a patch that meets a fourth search criteria in the third image; wherein the fourth search criteria is that grayscale values of pixels thereof are smaller than or equal to a fourth grayscale threshold and that the number of pixels therein, which are adjacent to each other and whose grayscale values are smaller than or equal to the fourth grayscale threshold, is smaller than or equal to a fourth adjacency threshold;

mapping the location of the patch that meets the third search criteria and the patch that meets the fourth search criteria into the skin area to be processed and the skin similarity image;

extracting the location of the patch and color values of pixels corresponding to the patch from the skin area to be processed; if the color values are within a predetermined blemish color threshold range; then extracting grayscale values of the corresponding pixels within a predetermined range centered at the location of the patch from the skin similarity image, and judging whether the grayscale values are within a grayscale threshold range representing similar skin color;

If yes, taking one or more searched patches that meet the third search criteria as the third set of skin blemishes, and taking one or more searched patches that meet the fourth search criteria as the fourth set of skin blemishes.

Preferably, the step of generating a first image with a first black/white contrast comprises: performing a first grayscale processing on the skin area to be processed to generate a first image with a first black/white contrast;

the step of generating a second image with a second black/white contrast comprises: performing a second grayscale processing on the skin area to be processed to generate a second image with a second black/white contrast; wherein the way of the second grayscale processing is different from that of the first grayscale processing;

the step of generating a third image with a third black/white contrast comprises: performing a dermabrasion processing on the skin area to be processed to obtain a dermabrasion-processed image, and then performing a third grayscale processing to the dermabrasion-processed image to generate a third image with a third black/white contrast; wherein the way of the third grayscale processing is identical with that of the first grayscale processing.

Preferably, said removing the skin blemishes in the facial area according to the determined locations of the skin blemishes in the skin area to be processed to obtain a processed image comprises:

mapping the skin blemishes in the skin area to be processed into the facial area of the image to be processed;

removing the skin blemishes in the facial area of the image to be processed according to the result of mapping to obtain a processed image.

Preferably, after mapping the skin blemishes in the skin area to be processed into the facial area of the image to be processed, the method further comprises:

scaling up the areas where the skin blemishes are located in the image to be processed according to a preset second scale, wherein the preset second scale is greater than 1.

Preferably, said removing the skin blemishes in the facial area of the image to be processed according to the result of mapping to obtain a processed image comprises:

calculating a lateral skin color varying function y=f(x) and a longitudinal skin color varying function y'=f(x') corresponding to a pixel located in a preset relative location in a skin blemish in the facial area of the image to be processed, wherein x represents the lateral coordinate of a pixel in the image to be processed, x' represents the longitudinal coordinate of a pixel in the image to be processed, y represents the color value corresponding to a pixel whose lateral coordinate is x, and y' represents the color value corresponding to a pixel whose longitudinal coordinate is x';

plugging the lateral coordinate and longitudinal coordinate of each pixel in the skin blemish in the facial area of the image to be processed into the above-mentioned lateral skin color varying function and longitudinal skin color varying function respectively to obtain lateral and longitudinal color values of each pixel;

averaging the lateral and longitudinal color values of each pixel, to obtain a normal skin color value corresponding to each pixel;

replacing the color value of each pixel of the skin blemish in the facial area of the image to be processed with the calculated normal skin value of each pixel in order, thereby removing skin blemishes in the facial area of the image to be processed to obtain a processed image.

Preferably, the method further comprises performing dermabrasion processing on the processed image to obtain an image in which conspicuous effect is removed Preferably, the skin blemishes comprise any one or more of the blemishes below: acne, stain, scar or mole.

In order to achieve the objective described above, embodiments of the present application disclose a device for image processing, the device comprising:

a facial recognition module which is used to perform facial recognition on an image to be processed;

a determination module for skin area, which is used to determine a skin area to be processed in a facial area according to detection results;

a determination module for skin blemish, which is used to determine the locations of skin blemishes in the skin area to be processed;

a removal module for skin blemish, which is used to remove the skin blemishes in the facial area according to the determined locations of the skin blemishes in the skin area to be processed to obtain a processed image.

Preferably, the determination module for skin area comprises:

a detection submodule for covered area, which is used to detect covered areas in the facial area;

a determination submodule for non-covered area, which is used to determine a non-covered area in the facial area according to the covered areas;

a detection submodule for skin area, which is used to detect the skin area in the non-covered area or detect the skin area in the facial area.

Preferably, the image to be processed comprises:

an original image to be processed or an image obtained by scaling up/down the original image to be processed according to a preset first scale.

Preferably, the determination module for skin blemish comprises:

an obtainment submodule for images with different levels of conspicuousness, which is used to obtain images with different levels of blemish conspicuousness for the skin area to be processed;

a generation submodule for skin similarity image, which is used to determine color values of the skin area to be processed and generate a skin similarity image for the skin area to be processed according to the color values;

a determination submodule for skin blemish, which is used to determine the locations of the skin blemishes in the skin area to be processed according to the images with different levels of blemish conspicuousness and the skin similarity image.

Preferably, the generation submodule for skin similarity image comprises:

an obtainment unit for sampling value, which is used to sample the skin color value of a number of areas in the skin area to be processed respectively to obtain a number of sampling values for each area;

a calculation unit for skin color value, which is used to calculate a skin color value for each area according to the sampling values;

a similarity calculation unit, which is used to traverse pixels in each area respectively, and to calculate a similarity value between the color value of each pixel and the skin color value of the area in which the pixel is located;

a generation unit for skin similarity image, which is used to map the calculated similarity values into grayscale values to generate a skin similarity image reflecting skin color.

Preferably, the obtainment submodule for images with different levels of conspicuousness comprises:

a first image generation unit, which is used to generate a first image with a first black/white contrast;

a second image generation unit, which is used to generate a second image with a second black/white contrast; wherein the first black/white contrast is greater than the second black/white contrast;

a third image generation unit, which is used to generate a third image with a third black/white contrast; wherein the third black/white contrast is the same as the first black/white contrast;

a determination submodule for skin blemish, which is specifically used to determine the locations of the skin blemishes in the skin area to be processed according to the first, the second and the third images, as well as the skin similarity image.

Preferably, the determination submodule for skin blemish is specifically used to: generate a first set of skin blemishes according to the second image and the skin similarity image; generate a second set of skin blemishes according to the first image and the skin similarity image; generate a third set of skin blemishes and a fourth set of skin blemishes according to the third image and the skin similarity image; combine the first to fourth sets of skin blemishes together to obtain the locations of all the skin blemishes in the skin area to be processed.

Preferably, the determination submodule for skin blemish comprises:

a generation unit for first set of skin blemishes, which is used to generate a first set of skin blemishes according to the second image, the skin similarity image and the skin area to be processed;

a generation unit for second set of skin blemishes, which is used to generate a second set of skin blemishes according to the first image, the skin similarity image and the skin area to be processed;

a generation unit for third and fourth set of skin blemishes, which is used to generate a third set of skin blemishes and a fourth set of skin blemishes according to the third image, the skin similarity image and the skin area to be processed;

an obtainment unit for skin blemish, which is used to combine the first to fourth sets of skin blemishes together to obtain the locations of all the skin blemishes in the skin area to be processed.

Preferably, the generation unit for first set of skin blemishes comprises:

a first searching subunit, which is used to search for a patch that meets a first search criteria in the second image; wherein the first search criteria is that grayscale values of pixels thereof are smaller than or equal to a first grayscale threshold and that the number of pixels therein, which are adjacent to each other and whose grayscale values are smaller than or equal to the first grayscale threshold, is smaller than or equal to a first adjacency threshold;

a first mapping subunit, which is used to map the location of the patch into the skin area to be processed and the skin similarity image;

a first extraction subunit for location and color value of patch, which is used to extract the location of the patch and color values of pixels corresponding to the patch from the skin area to be processed;

a first judgment subunit for grayscale value, which is used to extract grayscale values of the corresponding pixels within a predetermined range centered at the location of the patch from the skin similarity image, and to judge whether the grayscale values are within a grayscale threshold range representing similar skin color in the case that the color values extracted by the first extraction subunit for location and color value of patch are within a predetermined blemish color threshold range; if yes, to take one or more searched patches as the first set of skin blemishes.

Preferably, the generation unit for second set of skin blemishes comprises:

a second searching subunit, which is used to search for a patch that meets a second search criteria in the first image; wherein the second search criteria is that grayscale values of pixels thereof are smaller than or equal to a second grayscale threshold and that the number of pixels therein, which are adjacent to each other and whose grayscale values are smaller than or equal to the second grayscale threshold, is smaller than or equal to a second adjacency threshold;

a second mapping subunit, which is used to map the location of the patch into the skin area to be processed and the skin similarity image;

a second extraction subunit for location and color value of patch, which is used to extract the location of the patch and color values of pixels corresponding to the patch from the skin area to be processed;

a second judgment subunit for grayscale value, which is used to extract grayscale values of the corresponding pixels within a predetermined range centered at the location of the patch from the skin similarity image, and to judge whether the grayscale values are within a grayscale threshold range representing similar skin color in the case that the color values extracted by the second extraction subunit for location and color value of patch are within the predetermined blemish color threshold range; if yes, to take one or more searched patches as the second set of skin blemishes.

Preferably, the generation unit for third and fourth set of skin blemishes comprises:

a third searching subunit, which is used to search for a patch that meets a third search criteria in the third image; wherein the third search criteria is that grayscale values of pixels thereof are smaller than or equal to a third grayscale threshold and that the number of pixels therein, which are adjacent to each other and whose grayscale values are smaller than or equal to the third grayscale threshold, is smaller than or equal to a third adjacency threshold;

a fourth searching subunit, which is used to search for a patch that meets a fourth search criteria in the third image; wherein the fourth search criteria is that grayscale values of pixels thereof are smaller than or equal to a fourth grayscale threshold and that the number of pixels therein, which are adjacent to each other and whose grayscale values are smaller than or equal to the fourth grayscale threshold, is smaller than or equal to a fourth adjacency threshold;

a third mapping subunit, which is used to map the location of the patch that meets the third search criteria and the patch that meets the fourth search criteria into the skin area to be processed and the skin similarity image;

a third extraction subunit for location and color value of patch, which is used to extract the location of the patch and color values of pixels corresponding to the patch from the skin area to be processed;

a third judgment subunit for grayscale value, which is used to extract grayscale values of the corresponding pixels within a predetermined range centered at the location of the patch from the skin similarity image, and to judge whether the grayscale values are within a grayscale threshold range representing similar skin color in the case that the color values are within the predetermined blemish color threshold range; if yes, to take one or more searched patches that meet the third search criteria as the third set of skin blemishes and take one or more searched patches that meet the fourth search criteria as the fourth set of skin blemishes.

Preferably, the first image generation unit is specifically used to perform a first grayscale processing on the skin area to be processed to generate a first image with a first black/white contrast;

the second image generation unit is specifically used to perform a second grayscale processing on the skin area to be processed to generate a second image with a second black/white contrast; wherein the way of the second grayscale processing is different from that of the first grayscale processing;

the third image generation unit is specifically used to perform a dermabrasion processing on the skin area to be processed to obtain a dermabrasion-processed image, and then to perform a third grayscale processing to the dermabrasion-processed image to generate a third image with a third black/white contrast; wherein the way of the third grayscale processing is identical with that of the first grayscale processing.

Preferably, the removal module for skin blemish comprises:

a mapping submodule for skin blemish, which is used to map the skin blemishes in the skin area to be processed into the facial area of the image to be processed;

a removal submodule for skin blemish, which is used to remove the skin blemishes in the facial area of the image to be processed according to the result of mapping to obtain a processed image.

Preferably, the removal module for skin blemish further comprises:

a scaling submodule for skin blemish, which is used to scale up the areas where the skin blemishes are located in the image to be processed according to a preset second scale after the mapping submodule for skin blemish maps the skin blemishes in the skin area to be processed into the facial area of the image to be processed, wherein the preset second scale is greater than 1.

Preferably, the removal submodule for skin blemish comprises:

a function calculation unit, which is used to calculate a lateral skin color varying function y=f(x) and a longitudinal skin color varying function y'=f(x') corresponding to a pixel located in a preset relative location in a skin blemish in the facial area of the image to be processed, wherein x represents the lateral coordinate of a pixel in the image to be processed, x' represents the longitudinal coordinate of a pixel in the image to be processed, y represents the color value corresponding to a pixel whose lateral coordinate is x, and y' represents the color value corresponding to a pixel whose longitudinal coordinate is x';

an obtainment unit for lateral and longitudinal color value, which is used to plug the lateral coordinate and longitudinal coordinate of each pixel in the skin blemish in the facial area of the image to be processed into the above-mentioned lateral skin color varying function and longitudinal skin color varying function respectively to obtain lateral and longitudinal color values of each pixel;

an obtainment unit for normal skin color value, which is used to average the lateral and longitudinal color values of each pixel, to obtain a normal skin color values corresponding to each pixel;

a replacement unit for color value, which is used to replace the color value of each pixel of the skin blemish in the facial area of the image to be processed with the calculated normal skin value of each pixel in order, thereby removing skin blemishes in the facial area of the image to be processed to obtain a processed image.

Preferably, the device further comprises a dermabrasion processing module;

the dermabrasion processing module is used to perform dermabrasion processing on the processed image to obtain an image in which conspicuous effect is removed.

Preferably, the skin blemishes comprise any one or more of the blemishes below: acne, stain, scar or mole.

In order to achieve the objective described above, embodiments of the present application disclose a terminal which comprises:

a processor, a memory, a communication interface and a bus;

the processor, the memory and the communication interface connect to and communicate with each other via the bus;

the memory stores executable program code;

the processor executes the program corresponding to the executable program code by reading the executable program code stored in the memory, so as to:

perform facial recognition on an image to be processed;

determine a skin area to be processed in a facial area according to detection results;

determine the locations of skin blemishes in the skin area to be processed;

remove the skin blemishes in the facial area according to the determined locations of the skin blemishes in the skin area to be processed to obtain a processed image.

Furthermore, embodiments of the present application disclose an application, which is used to perform the method for image processing described in the embodiments of the present application when being executed.

Furthermore, embodiments of the present application also disclose a storage medium for storing an application that is used to perform the method for image processing described in the embodiments of the present application.

It can be seen from the technical solutions above that not only light-colored blemishes but also obvious facial skin problems are removed by applying the method and the device for image processing provided by the embodiments of the present application. In contrast to the solutions for manual removal of facial skin blemishes in various existing APPs of facial skin beautification, the method provided by the present application provides a better experience for users.

Certainly, any product or method implementing the present application does not necessarily achieve all the advantages described above at the same time.

BRIEF DESCRIPTION OF THE DRAWINGS

In order to describe the technical solutions in the embodiments of the present application and in prior art more clearly, appended drawings required for describing the embodiments of the present application and prior art will be briefly described below. Obviously, the appended drawings described below are only some embodiments of the present application, and those skilled in the art can obtain other drawings according to these drawings without doing creative works.

DETAILED DESCRIPTION

In order to make the objectives, technical solutions and advantages of the present application more clear, the present application will be further described in detail below with reference to the appending drawings and by describing embodiments. Obviously, described embodiments are only some embodiments of the present application, and are not all the embodiments. Based on the embodiments in the present application, all other embodiments obtained by a person skilled in the art without doing creative works will fall in the protection scope of the present application.

Terms used herein will be briefly introduced below.

RGB color channel: RGB (R is red, G is green, B is blue) is a form for representing color in computers. Any color can be represented by RGB form, that is to say, any color can be represented by the amount of color R component, G component, and B component. R color channel represents separate red component in an image, which is generally represented by grayscale scale image. The closer the color is to black, the less the red component is; while the closer the color is to white, the more the red component is. G color channel and B color channel have analogous concepts.

Dermabrasion: After performing dermabrasion on an image one time, many light-colored patches on skin will be removed, thus rendering skin appear smooth and delicate. There are many kinds of dermabrasion algorithms, but all of them can only remove relatively light-colored blemishes such as relatively light-colored acnes, scars, but cannot remove acnes, scars directly with dermabrasion.

The present application will be described in detail below by way of specific embodiments.

Figure 1:
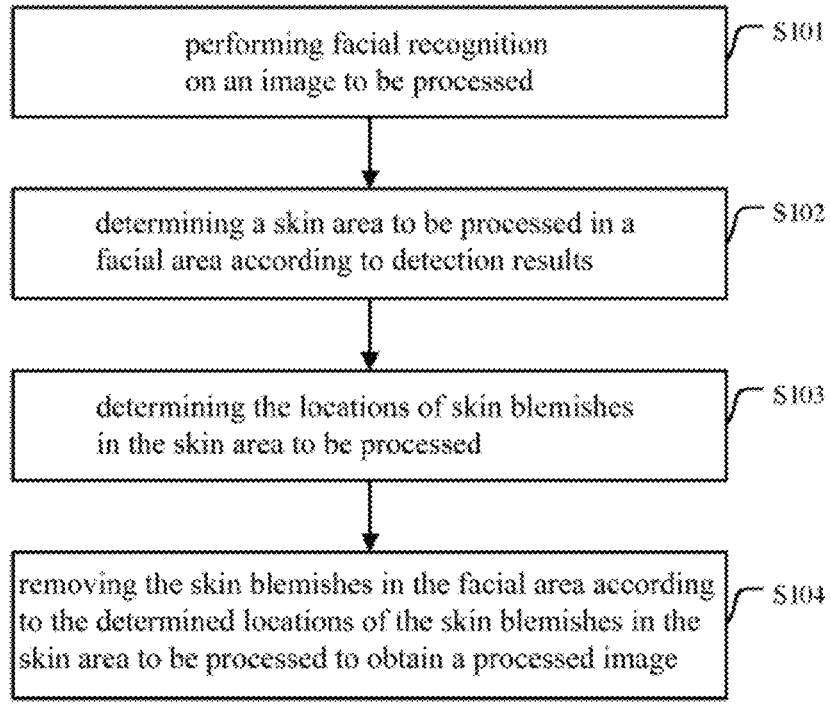
FIG. 1 is a flowchart of a method for image processing according to an embodiment of the present application.

Refer to FIG. 1, a flowchart of a method for image processing according to an embodiment of the present application, which specifically comprises:

S101: performing facial recognition on an image to be processed.

In practical application, images took with terminal devices such as mobile phones, tablets, digital cameras and so on, are relatively large or relatively small. When processing these images, on one hand processing speed is proportional to the size of an image, and on the other hand processing effect may be affected if size of an image is small and the details of it are not clear. Therefore, an original image to be processed may be scaled up/down before image processing, and then corresponding processing may be done to the original image to be processed after scaling up/down.

Figure 3:
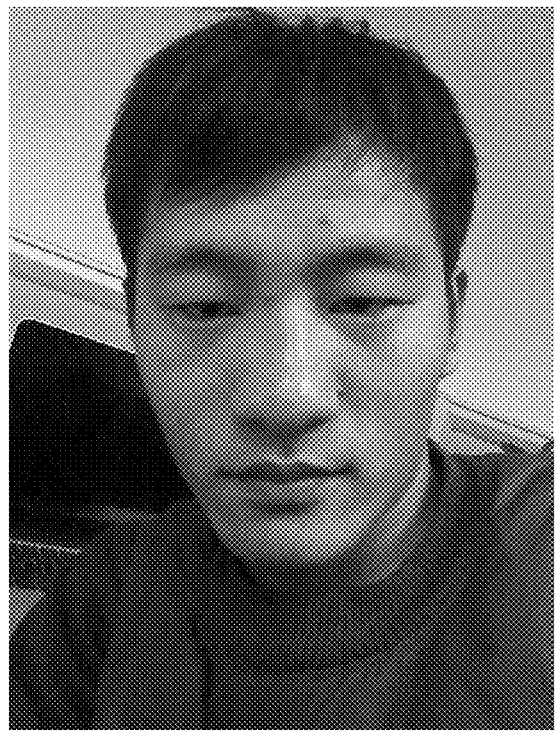
FIG. 3 is a specific example of an image to be processed according to an embodiment of the present application.

Therefore, it may be known from above that the image to be processed may be an original image to be processed or an image obtained by scaling up/down the original image to be processed according to a predetermined first scale, for example, an image obtained by scaling down the original image to be processed according to a scale of 1:2. Specifically, refer to FIG. 3, which is a specific example of the image to be processed provided by embodiments of the present application.

In addition, performing facial recognition on the image to be processed may be the determination of a facial area in the image to be processed manually by a user, and may also be recognition of the facial area by facial recognition technology. Facial recognition technology is a technology for analyzing an input image based on human's facial features, which may be done by firstly judging whether there is a facial area in an image, and if yes, by further detecting the location, size of the facial area in the image, and the locations of respective main facial organs and the like. There have already been various methods for achieving facial recognition in prior art, which are omitted here.

S102: determining a skin area to be processed in a facial area according to detection results.

In practical application, when determining the skin area to be processed, some areas in the facial area may be covered in order to avoid mistaking the non-blemished area on the face for blemished area. In a specific embodiment of the present application, a method for determining a skin area to be processed in a facial area is provided, which may specifically comprise:

detecting covered areas in the facial area;

determining a non-covered area in the facial area according to the covered areas;

detecting the skin area in the non-covered area;

or detecting the skin area in the facial area.

In practical application, in order to avoid mistaking certain pixels in facial organ areas for skin blemishes, the covered areas described above may include facial organ areas. For facial organ areas on the face, the locations of the facial organs may also be obtained by facial recognition, and the covered areas may be determined according to the location information of the facial organs. Sometimes eyebrows may be covered by hair, so detection may not be applied if no eyebrow is detected. After detecting the facial organs, sizes and locations thereof may be marked by certain models. For example, the location of an eye may be marked by an ellipse or by a rectangle directly, thereby a covered area is obtained. When mouth is covered, an ellipse is used, and a U-shaped model is used when nose is covered. In the latter case, shadows at both sides of the nose and nostrils at the bottom of the nose may be covered, while its apex portion may remain as the skin to be processed and undergo the skin blemish removal.

It should be noted that after the skin area to be processed is determined in the facial area, this area may either be stored as an image in order to perform subsequent image processing, or not be stored separately, instead the corresponding location thereof may be marked in the image to be processed, and the skin area to be processed will be processed subsequently according to the marked location.

S103: determining the locations of skin blemishes in the skin area to be processed.

Figure 2:
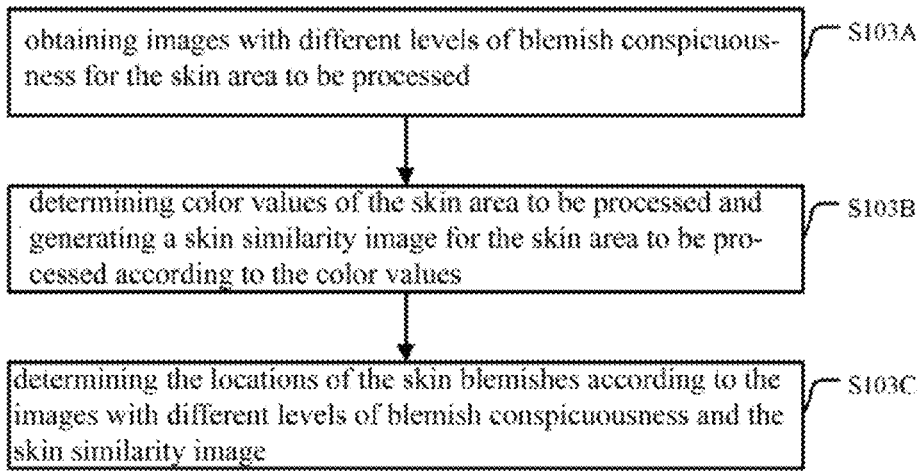
FIG. 2 is a flowchart of a method of determining the locations of skin blemishes in a skin area to be processed according to an embodiment of the present application.

Implementations of this step may refer to the method for determining the locations of skin blemishes in the skin area to be processed in FIG. 2 of the embodiments of the present application.

S104: removing the skin blemishes in the facial area according to the determined locations of the skin blemishes in the skin area to be processed to obtain a processed image.

Figure 8:
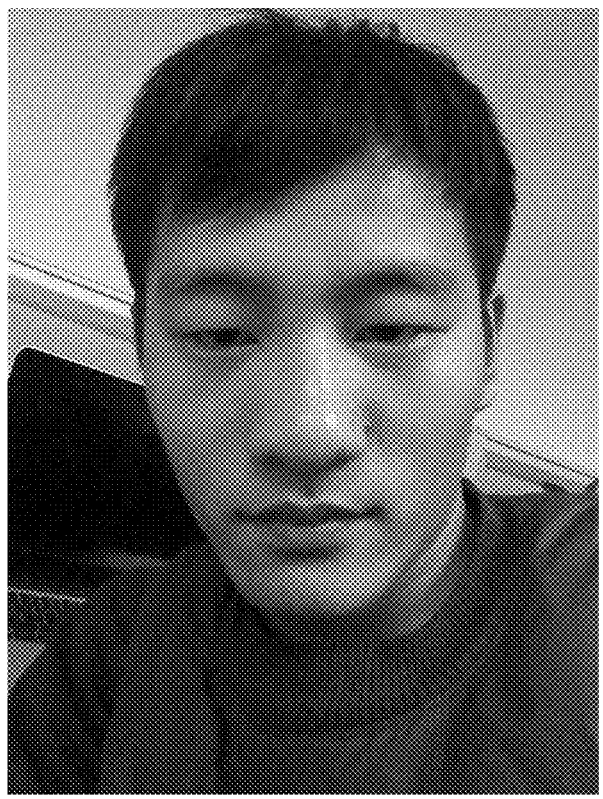
FIG. 8 is a specific example of a processed image corresponding to the image shown in FIG. 3 according to an embodiment of the present application.

After the locations of the skin blemishes in the skin area to be processed are determined according to S103, firstly the skin blemishes may be mapped into the facial area of the image to be processed. Then the skin blemishes are removed from the facial area of the image to be processed according to the result of mapping, thus obtaining a processed version of the image to be processed as referred to FIG. 8. FIG. 8 is a specific example of a processed image corresponding to the image shown in FIG. 3 according to the embodiments of the present application.

Specifically, removing the skin blemishes in the facial area of the image to be processed according to the result of mapping may be achieved in the following way:

calculating a lateral skin color varying function $y=f(x)$ and a longitudinal skin color varying function $y'=f(x')$ corresponding to a pixel located in a preset relative location in a skin blemish in the facial area of the image to be processed, wherein x represents the lateral coordinate of a pixel in the image to be processed, x' represents the longitudinal coordinate of a pixel in the image to be processed, y represents the color value corresponding to a pixel whose lateral coordinate is x, and y' represents the color value corresponding to a pixel whose longitudinal coordinate is x';

plugging the lateral coordinate and longitudinal coordinate of each pixel in the skin blemish in the facial area of the image to be processed into the above-mentioned lateral skin color varying function and longitudinal skin color varying function respectively to obtain lateral and longitudinal color values of each pixel;

averaging the lateral and longitudinal color values of each pixel, to obtain a normal skin color value corresponding to each pixel;

replacing the color value of each pixel of the skin blemish in the facial area of the image to be processed with the calculated normal skin value of each pixel in order, thereby removing skin blemishes in the facial area of the image to be processed to obtain a processed image;

wherein the pixel in the preset relative location may be a pixel in the center of a skin blemish, or a pixel at the upper left corner of a skin blemish or the like. The preset relative location is not limited here, and may be determined according to specific circumstances in practical application.

It should be noted that the calculation of the above-mentioned lateral and longitudinal skin color varying function is performed under the condition that the skin color values of a skin area vary continuously.

It should be noted that the color value described above may be values representing all the color components of a pixel, such as the grayscale value of R color channel, the grayscale value of G color channel, and the grayscale value of B color channel in an RGB image, and may also be a value representing a certain color component of a pixel, such as the grayscale value of G color channel.

The step of calculating a lateral skin color varying function $y=f(x)$ and a longitudinal skin color varying function $y'=f(x')$ corresponding to a pixel located in a preset relative location in a skin blemish in the facial area of the image to be processed may comprise:

sampling, in both lateral direction and longitudinal direction, the skin color on both sides of the pixel in the preset relative location in the skin blemish in the facial area of the image to obtain a number of sampling points, then fitting a function that varies continuously in either direction, i.e. the lateral skin color varying function $y=f(x)$ or the longitudinal skin color varying function $y'=f(x')$, according to the color values of these sampling points.

It should be noted that the method for calculating the normal skin color value is not limited in this application, and any possible method may be used here, while the method described above is just a possible embodiment.

Since in general case color varies continuously between a skin blemish area in the image to be processed and the area around it, the skin blemish area may further be scaled up according to a preset second scale in the image to be processed after mapping the determined skin blemish into a preset mapping image, such that the skin blemish is better removed, wherein the preset second scale is greater than 1.

In a specific embodiment of the present application, the method may further comprise: performing dermabrasion processing on the processed image to obtain an image in which the conspicuous effect is removed.

Figure 9:
FIG. 9 is a specific example of an image obtained after performing dermabrasion processing to the image shown in FIG. 8 according to an embodiment of the present application.

Refer to FIG. 8 for the processed image. Dermabrasion processing may remove light-colored marks left during the process of removing skin blemishes, thus achieving a better effect. Refer to FIG. 9, which is a dermabrasion-processed image corresponding to the image shown in FIG. 8 according to an embodiment of the present application. Comparing FIG. 9 with FIG. 3, it can be seen that the effect of removing the skin blemishes is quite obvious.

In addition, it may be known from the previous descriptions that the image to be processed may be an original image to be processed and may also be an image obtained by scaling up/down the original image to be processed according to the preset first scale. When the image to be processed is the image obtained by scaling up/down the original image to be processed according to the preset first scale, it should further be scaled up to the size of the original image to be processed after the processed version of the image to be processed is obtained. For example, if the image to be processed is the image obtained by scaling down the original image to be processed according to a scale of 1:2, it should further be scaled up to the size of the original image to be processed according to a scale of 2:1 after the corresponding processed version of the image to be processed is obtained.

It can be seen from above that in this solution the facial skin in an image is modified automatically by performing the method shown in FIG. 1, that is to say that both light-colored blemishes and obvious blemishes on the facial skin are removed. In contrast to the solutions for removing facial skin blemishes manually in various existing APPs of facial skin beautification, the method provided by the present application provides a better experience for users.

Specifically, embodiments of the present application also provide a specific method for determining the locations of skin blemishes in the skin area to be processed. Refer to FIG. 2, which is a flowchart of a method for determining the locations of skin blemishes in the skin area to be processed according to embodiments of the present application, the method comprising:

S103A: obtaining images with different levels of blemish conspicuousness for the skin area to be processed.

Specifically, the step of obtaining images with different levels of conspicuousness may comprise:

generating a first image with a first black/white contrast;

generating a second image with a second black/white contrast; wherein the first black/white contrast is greater than the second black/white contrast;

generating a third image with a third black/white contrast; wherein the third black/white contrast is the same as the first black/white contrast.

Furthermore, the step described above may be: performing a first grayscale processing on the skin area to be processed to generate a first image with a first black/white contrast; performing a second grayscale processing on the skin area to be processed to generate a second image with a second black/white contrast, wherein the way of the second grayscale processing is different from that of the first grayscale processing; firstly performing a dermabrasion processing on the skin area to be processed to obtain a dermabrasion-processed image, and then performing a third grayscale processing on the dermabrasion-processed image to generate a third image with a third black/white contrast, wherein the way of the third grayscale processing is identical with that of the first grayscale processing.

Figure 4:
FIG. 4 is a specific example of a first image according to an embodiment of the present application.
Figure 5:
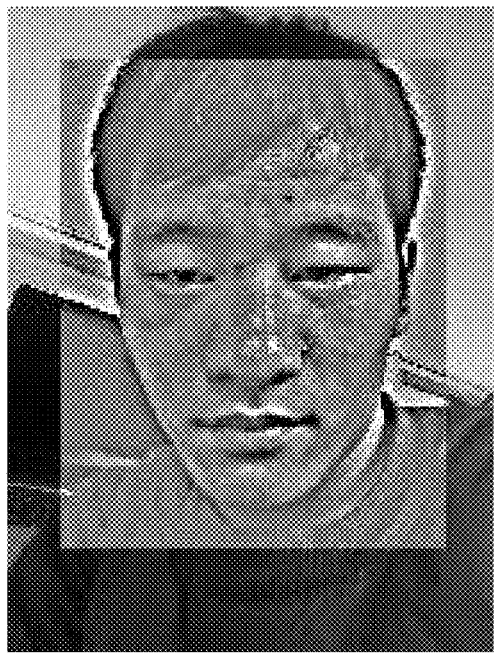
FIG. 5 is another specific example of a first image according to an embodiment of the present application.

In practical application, the step of generating a first image may comprise: performing "high passing" one time and "vivid lightening" at least three times on the skin area to be processed to obtain a first image; or performing "high passing" one time and "hard lightening" at least three times on the skin area to be processed to obtain a first image. Refer to FIG. 4 or FIG. 5 for this first image, wherein FIG. 4 is a specific example of the first image according to embodiments of the present application, which may be called IMAGE_ALPHA_BIG, and FIG. 5 is another specific example of the first image according to embodiments of the present application, which may be called IMAGE_AL-PHA_LIGHT.

Figure 6:
FIG. 6 is a specific example of a second image according to an embodiment of the present application.

The step of generating a second image may comprise: performing "high passing" one time and "vivid lightening" at least one time on the skin area to be processed to obtain a second image; or performing "high passing" one time and "hard lightening" at least one time on the skin area to be processed to obtain a second image. Refer to FIG. 6 for this second image, wherein FIG. 6 is a specific example of the second image according to embodiments of the present application, which may be called IMAGE_ALPHA_NO_LIGHT.

In the steps described above, when "vivid lightening" or "hard lighting" processing is adopted, the number of processing times for generating the second image is smaller than that for generating the first image.

Figure 7:
FIG. 7 is a specific example of a third image according to an embodiment of the present application.

The step of generating a third image may comprise: performing a dermabrasion processing on the skin area to be processed to obtain a dermabrasion-processed image; then performing "high passing" one time and "vivid lightening" at least three times on the skin area to be processed to obtain a third image; or performing "high passing" one time and "hard lightening" at least three times on the skin area to be processed to obtain a third image. Refer to FIG. 7 for this third image, wherein FIG. 7 is a specific example of the third image according to embodiments of the present application, which may be called IMAGE_ALPHA_FINAL.

The step of performing a dermabrasion processing on the skin area to be processed to obtain a dermabrasion-processed image may comprise:

slightly lightening the green channel of the skin area to be processed in the same way as "curve" adjusting of the Photoshop software, and combining the image after being lightened with the image before being lightened with the grayscale value of a corresponding pixel of the grayscale image as transparency. Specifically, assuming that the grayscale value is alpha, then alpha=0 indicates a black image, while alpha=1 indicates a white image, wherein the value of alpha is a decimal between [0,1]; assuming that the grayscale value of a current pixel of the green channel of the skin area to be processed is huidu_green, assuming that the grayscale value after lightening is huidu_light, and assuming that the grayscale value after combining is huidu_final=huidu_green×alpha+huidu_light×(1.0−alpha), then an image is obtained with the green channel thereof undergone a dermabrasion processing.

It should be noted that the specific steps described above are illustrated by taking the image processing using the Photoshop software as an example, and the specific methods for generating the first, the second and the third images are not limited in the present application. Any known, disclosed program may be used to process the skin area to be processed described above, as long as the generated first, second and third images are all black and white images (i.e. grayscale images) and the black/white contrast of the first image is greater than that of the third and the second image.

It should be noted that in a preferred embodiment of the present application, the grayscale processing may be performed on the green channel of the skin area to be processed when performing the grayscale processing on the skin area to be processed. The green channel is selected because skin blemishes in the red channel are generally not distinct, too many parti-colors present in the blue channel, and the green channel is moderate. Certainly, in other possible embodiments, the same weight or different weights may be assigned to red, green, blue components separately, after that, the average thereof is calculated. Then grayscale processing is performed on the image undergone average calculation.

The objective of generating the first image is to find out areas which are more conspicuous and darker-colored than surrounding areas in the skin area such as facial area more properly, wherein the blacker a portion is, the more conspicuous it is and the darker the color is in the skin area to be processed. Refer to FIG. 4 or FIG. 5 for the first image.

The objective of generating the second image is to highlight obvious skin blemishes in order to search relatively obvious skin blemishes subsequently. Refer to FIG. 6 for the second image.

Since pixels whose color is slightly darker than the color of surrounding pixels are highlighted in the first image, these pixels will also become close to black. If there are skin blemishes such as acnes in vicinity of these pixels, the acnes will also become black, thereby the acnes might combine with these pixels into a stretch, which results in a large number when judging the total number of pixels in this black area. The large number may exceed a preset adjacency threshold for the number of the pixels adjacent to each other, thus resulting in misjudgment. With the third image, such misjudgment is avoided for the slightly darker-colored pixels have already been removed by dermabrasion operation, i.e., the dermabrasion operation makes it possible to highlight areas which are still conspicuous again in the image after dermabrasion processing is performed one time. Refer to FIG. 7 for the third image.

It should be noted that the generation of the first, second, third image with three levels of blemish conspicuousness is just an example for highlighting skin blemishes of different sizes, but the present application is not limited thereto. A person skilled in the art may set images with various conspicuousness levels, for example, four, five and so on according to the design concept of the present application, thereby highlight skin blemishes in more details and achieve good effect of skin blemish removal.

S103B: determining color values of the skin area to be processed and generating a skin similarity image for the skin area to be processed according to the color values.

Specifically, this step may be achieved in the following way:

sampling the skin color value of a number of areas in the skin area to be processed respectively to obtain a number of sampling values for each area;

calculating a skin color value for each area according to the sampling values;

traversing pixels in each area respectively, and calculating a similarity value between the color value of each pixel and the skin color value of the area in which the pixel is located;

mapping the calculated similarity values into grayscale values to generate a skin similarity image reflecting skin color;

wherein the higher the similarity values are, the closer the image is to white; vice versa.

In the steps described above, the reason for dividing the skin area to be processed into a number of areas is that sometimes due to the direction of light, obvious color difference may appear on the skin from left to right or from top to bottom. In order to weaken the influence of this color difference on the judgment of skin color and of similarity, the skin area to be processed may be divided into a number of areas. Take human face for example, the human face may be divided into four rectangular areas (i.e., upper left, upper right, lower left, lower right) with the nose as center, and sampling and similarity calculation are performed for these areas respectively. For an image which is not affected by the brightness of the light, this calculation method does not affect calculation results.

S103C: determining the locations of the skin blemishes according to the images with different levels of blemish conspicuousness and the skin similarity image.

In S103A described above, when the generated images with different levels of blemish conspicuousness comprise the first, the second and the third images, the locations of skin blemishes may be determined according to the first, the second and the third images as well as the skin similarity image in this step.

Specifically, determining the locations of skin blemishes according to the first, the second and the third images as well as the skin similarity image may comprise:

generating a first set of skin blemishes according to the second image and the skin similarity image, wherein reference may be made to FIG. 6 for the second image;

generating a second set of skin blemishes according to the first image and the skin similarity image, wherein reference may be made to FIG. 5 for the first image;

generating a third set of skin blemishes and a fourth set of skin blemishes according to the third image and the skin similarity image, wherein reference may be made to FIG. 7 for the third image;

combining the first to fourth sets of skin blemishes together to obtain the locations of all the skin blemishes in the skin area to be processed.

The step of generating a first set of skin blemishes according to the second image and the skin similarity image may comprise:

searching for a patch that meets a first search criteria in the second image (see FIG. 6); wherein the first search criteria is that grayscale values of pixels thereof are smaller than or equal to a first grayscale threshold such as 30 (0 represents black, 255 represents white) and that the number of pixels therein, which are adjacent to each other and whose grayscale values are smaller than or equal to the first grayscale threshold, is smaller than or equal to a first adjacency threshold. If the width of human face is assumed to be about 100 pixels, then the relatively proper value of the first adjacency threshold is 6;

mapping the location of the patch to the skin similarity image;

extracting grayscale values of pixels corresponding to the location of the patch from the skin similarity image, to judge whether the grayscale value of each pixel is within a preset range of the skin blemish grayscale value, i.e., to judge whether the color values of pixels in the skin area to be processed corresponding to the patch are close to the color values of skin blemishes such as acnes, and to judge whether corresponding grayscale values of pixels within a predetermined range centered at this location are within a grayscale threshold range representing similar skin color, so as to judge whether there is certain skin area around this patch;

if yes, taking one or more searched patches as the first set of skin blemishes.

The purpose of searching for the first set of skin blemishes described above is to find out more obvious skin blemishes such as acnes in larger dark-colored areas in the second image (see FIG. 6). Since large shadows in the first image (see FIG. 5) and the third image (see FIG. 7) are generally large black areas, the sizes of which exceed the threshold defined for acnes, thereby it tends to cause the skin blemishes such as acnes undetectable. In the second image (see FIG. 6), only the areas that are darker-colored and small-sized in the skin blemishes such as acnes can be made black, therefore this step may find out more obvious acnes in larger dark-colored areas.

The step of generating a second set of skin blemishes according to the first image and the skin similarity image may comprise:

searching for a patch that meets a second search criteria in the first image (see FIG. 5); wherein the second search criteria is that grayscale values of pixels thereof are smaller than or equal to a second grayscale threshold such as 30 (0 represents black, 255 represents white) and that the number of pixels therein, which are adjacent to each other and whose grayscale values are smaller than or equal to the second grayscale threshold, is smaller than or equal to a second adjacency threshold. If the width of human face is assumed to be about 100 pixels, then the relatively proper value of the second adjacency threshold is 30;

mapping the location of the patch to the skin similarity image;

extracting grayscale values of pixels corresponding to the location of the patch from the skin similarity image, to judge whether the grayscale value of each pixel is within a preset skin blemish grayscale value range, i.e., to judge whether the color values of pixels in the skin area to be processed corresponding to the patch are close to the color values of skin blemishes such as acnes, and to judge whether the grayscale values corresponding to the pixels within a predetermined range centered at this location are within a grayscale threshold range representing similar skin color, so as to judge whether there is certain skin area around this patch;

if yes, taking one or more searched patches as the second set of skin blemishes.

The purpose of searching for the second set of skin blemishes described above is to find out relatively lighter-colored and larger skin blemishes such as acnes. Since other parti-colors and slight changes on the skin such as acnes also become black in the first image in additional to skin blemishes (see FIG. 5), this causes the black areas corresponding to the skin blemishes such as acnes to become larger. After this searching, relatively lighter-colored but actually larger skin blemishes such as acnes may be found out.

The step of generating a third set of skin blemishes and a fourth set of skin blemishes according to the third image and the skin similarity image may comprise:

searching for a patch that meets a third search criteria in the third image (see FIG. 7); wherein the third search criteria is that grayscale values of pixels thereof are smaller than or equal to a third grayscale threshold such as 30 (0 represents black, 255 represents white) and that the number of pixels therein, which are adjacent to each other and whose grayscale values are smaller than or equal to the third grayscale threshold, is smaller than or equal to a third adjacency threshold. If the width of human face is assumed to be about 100 pixels, then the relatively proper value of the third adjacency threshold is 15;

searching for a patch that meets a fourth search criteria in the third image (see FIG. 7); wherein the fourth search criteria is that grayscale values of pixels thereof are smaller than or equal to a fourth grayscale threshold such as 30 (0 represents black, 255 represents white) and that the number of pixels therein, which are adjacent to each other and whose grayscale values are smaller than or equal to the fourth grayscale threshold, is smaller than or equal to a fourth adjacency threshold. If the width of human face is assumed to be about 100 pixels, then the relatively proper value of the fourth adjacency threshold is 30;

mapping the location of the patch that meets the third search criteria and the patch that meets the fourth search criteria into the skin similarity image;

extracting grayscale values of pixels corresponding to the location of the patch from the skin similarity image, to judge whether the grayscale value of each pixel is within a preset skin blemish grayscale value range, i.e., to judge whether the color values of pixels in the skin area to be processed corresponding to the patch are close to the color values of skin blemishes such as acnes, and to judge whether the grayscale values corresponding to the pixels within a predetermined range centered at this location are within a grayscale threshold range representing similar skin color, so as to judge whether there is certain skin area around this patch;

If yes, taking one or more searched patches that meet the third search criteria as the third set of skin blemishes, and taking one or more searched patches that meet the fourth search criteria as the fourth set of skin blemishes.

The purpose of searching for the third set of skin blemishes described above is to find out middle-sized skin blemishes such as acnes. Since many parti-colors have been removed during dermabrasion processing, and the color of remaining skin blemishes such as acnes have also become lighter, the black areas generated by acnes in the third image (see FIG. 7) become relatively moderate. Therefore, after this searching, middle-sized skin blemishes such as acnes may be found out.

The purpose of searching for the fourth set of skin blemishes described above is to find out larger skin blemishes such as acnes. Some skin blemishes are actually relatively larger, and then the black areas generated by such acnes in the third image (see FIG. 7) are relatively larger accordingly. After this searching, the skin blemishes such as acnes that are actually relatively larger may be found out.

It can be understood that after the four sets of skin blemishes are found, if they are found in a scaled image, the sets of skin blemishes found in the scaled image further need to be mapped into the original image to be processed, thus the locations of skin blemishes in the original image to be processed can be determined and the skin blemishes can be removed.

In S103A described above, when the generated images with different levels of blemish conspicuousness comprise the first, the second and the third images, the locations of the skin blemishes may be determined according to the first, the second and the third image, the skin similarity image as well as the image to be processed.

Specifically, the step of determining the locations of the skin blemishes according to the first, the second and the third image, the skin similarity image as well as the image to be processed may comprise:

generating a first set of skin blemishes according to the second image, the skin similarity image and the skin area to be processed, wherein reference may be made to FIG. 6 for the second image;

generating a second set of skin blemishes according to the first image, the skin similarity image and the skin area to be processed, wherein reference may be made to FIG. 5 for the first image;

generating a third set of skin blemishes and a fourth set of skin blemishes according to the third image, the skin similarity image and the skin area to be processed, wherein reference may be made to FIG. 7 for the third image;

combining the first to fourth sets of skin blemishes together to obtain the locations of all the skin blemishes in the skin area to be processed.

The step of generating a first set of skin blemish set according to the second image, the skin similarity image and the skin area to be processed may comprise:

searching for a patch that meets a first search criteria in the second image (see FIG. 6); wherein the first search criteria is that grayscale values of pixels thereof are smaller than or equal to a first grayscale threshold such as 30 (0 represents black, 255 represents white) and that the number of pixels therein, which are adjacent to each other and whose grayscale values are smaller than or equal to the first grayscale threshold, is smaller than or equal to a first adjacency threshold. If the width of human face is assumed to be about 100 pixels, then the relatively proper value of the first adjacency threshold is 6;

mapping the location of the patch into the skin area to be processed and the skin similarity image;

extracting the location of the patch and color values of pixels corresponding to the patch from the skin area to be processed; if the color values are within a predetermined blemish color threshold range, the color values corresponding to the patch in the skin area to be processed are close to the color of skin blemishes such as acnes; and then extracting grayscale values of the corresponding pixels within a predetermined range centered at the location of the patch from the skin similarity image, and judging whether the grayscale values are within a grayscale threshold range representing similar skin color, so as to judge whether there is a certain skin area around the patch;

if yes, taking one or more searched patches as the first set of skin blemishes.

The purpose of searching for the first set of skin blemishes described above is to find out more obvious skin blemishes such as acnes in larger dark-colored areas in the second image (see FIG. 6). Since large shadows in the first image (see FIG. 5) and the third image (see FIG. 7) are generally large black areas, the sizes of which exceed the threshold defined for acnes, thereby it tends to cause the skin blemishes such as acnes undetectable, while in the second image (see FIG. 6) only the areas that are darker-colored and small-sized in the skin blemishes such as acnes can be made black, therefore this step may find out more obvious acnes in larger darker-colored areas.

The step of generating a second set of skin blemishes according to the first image, the skin similarity image and the skin area to be processed may comprise:

searching for a patch that meets a second search criteria in the first image (see FIG. 5); wherein the second search criteria is that grayscale values of pixels thereof are smaller than or equal to a second grayscale threshold such as 30 (0 represents black, 255 represents white) and that the number of pixels therein, which are adjacent to each other and whose grayscale values are smaller than or equal to the second grayscale threshold, is smaller than or equal to a second adjacency threshold. If the width of human face is assumed to be about 100 pixels, then the relatively proper value of the second adjacency threshold is 30;

mapping the location of the patch into the skin area to be processed and the skin similarity image;

extracting the location of the patch and color values of pixels corresponding to the patch from the skin area to be processed; if the color values are within a predetermined blemish color threshold range, the color values corresponding to the patch in the skin area to be processed are close to the color of skin blemishes such as acnes; and then extracting grayscale values of the corresponding pixels within a predetermined range centered at the location of the patch from the skin similarity image, and judging whether these grayscale values are within a grayscale threshold range representing similar skin color, so as to judge whether there is a certain skin area around the patch;

if yes, taking one or more searched patches as the second set of skin blemishes.

The purpose of searching for the second set of skin blemishes described above is to find out relatively lighter-colored and larger skin blemishes such as acnes. Since other parti-colors and slight changes on the skin such as acnes also become black in the first image in additional to skin blemishes (see FIG. 5), this causes the black areas corresponding to the skin blemishes such as acnes to become larger. After this searching, relatively lighter-colored but actually larger skin blemishes such as acnes may be found out.

The step of generating a third set of skin blemishes and a fourth set of skin blemishes according to the third image, the skin similarity image and the skin area to be processed may comprise:

searching for a patch that meets a third search criteria in the third image (see FIG. 7); wherein the third search criteria is that grayscale values of pixels thereof are smaller than or equal to a third grayscale threshold such as 30 (0 represents black, 255 represents white) and that the number of pixels therein, which are adjacent to each other and whose grayscale values are smaller than or equal to the third grayscale threshold, is smaller than or equal to a third adjacency threshold. If the width of human face is assumed to be about 100 pixels, then the relatively proper value of the third adjacency threshold is 15;

searching for a patch that meets a fourth search criteria in the third image (see FIG. 7); wherein the fourth search criteria is that grayscale values of pixels thereof are smaller than or equal to a fourth grayscale threshold such as 30 (0 represents black, 255 represents white) and that the number of pixels therein, which are adjacent to each other and whose grayscale values are smaller than or equal to the fourth grayscale threshold, is smaller than or equal to a fourth adjacency threshold. If the width of human face is assumed to be about 100 pixels, then the relatively proper value of the fourth adjacency threshold is 30;

mapping the location of the patch that meets the third search criteria and the patch that meets the fourth search criteria into the skin area to be processed and the skin similarity image;

extracting the location of the patch and color values of pixels corresponding to the patch from the skin area to be processed; if the color values are within a predetermined blemish color threshold range, the color values corresponding to the patch in the skin area to be processed are close to the color of skin blemishes such as acnes; and then extracting grayscale values of the corresponding pixels within a predetermined range centered at the location of the patch from the skin similarity image, and judging whether the grayscale values are within a grayscale threshold range representing similar skin color, so as to judge whether there is a certain skin area around the patch;

If yes, taking one or more searched patches that meet the third search criteria as the third set of skin blemishes, and taking one or more searched patches that meet the fourth search criteria as the fourth set of skin blemishes.

The purpose of searching for the third set of skin blemishes described above is to find out middle-sized skin blemishes such as acnes. Since many parti-colors have been removed during dermabrasion processing, and the color of remaining skin blemishes such as acnes have also become lighter, the black areas generated by acnes in the third image (see FIG. 7) become relatively moderate. Therefore, after this searching, middle-sized skin blemishes such as acnes may be found out.

The purpose of searching for the fourth set of skin blemishes described above is to find out larger skin blemishes such as acnes. Some skin blemishes are actually larger, and then the black areas generated by such acnes in the third image (see FIG. 7) are relatively larger accordingly. After this searching, the skin blemishes such as acnes that are actually larger may be found out.

Finally, the locations and sizes of all the skin blemishes may be obtained by combining the skin blemishes with various features, i.e., by combining the first to fourth sets of skin blemishes together. In this way, the locations of all the skin blemishes may be obtained in the skin area to be processed.

It should be noted that the magnitudes of various thresholds described previously may be determined depending on actual demand, and the specific values of each threshold may be the same or not.

It should be noted that the skin blemishes described previously may be acnes, stains, moles, scars or the like, and the specific form of skin blemishes is not limited in the present application. Previous descriptions are illustrated by the example of acnes, and the removal of the stains, scars or the like may be achieved by changing the actual values of various thresholds during acne removing process.

It can be seen from above that in this solution skin blemishes in the skin area may be detected accurately and completely by obtaining images with different levels of conspicuousness and the skin similarity image for the skin area to be processed, which provides basis for removing skin blemishes.

Figure 10:
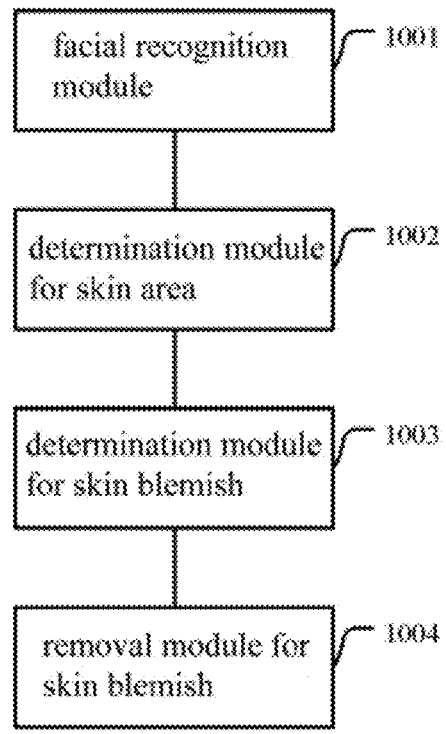
FIG. 10 is a schematic diagram of the logical structure of a device for image processing according to an embodiment of present application.

Refer to FIG. 10, which is a schematic diagram of the logic structure of a device for image processing according to embodiments of the present application. This structure specifically comprises: a facial recognition module 1001, a determination module for skin area 1002, a determination module for skin blemish 1003 and a removal module for skin blemish 1004;

wherein the facial recognition module 1001 is used to perform facial recognition on an image to be processed;

the determination module for skin area 1002 is used to determine a skin area to be processed in the image to be processed;

the determination module for skin blemish 1003 is used to determine the locations of skin blemishes in the skin area to be processed;

the removal module for skin blemish 1004 is used to remove the skin blemishes in the facial area according to determined locations of the skin blemishes in the skin area to obtain a processed image.

Specifically, the determination module for skin area 1002 may comprise: a detection submodule for covered area, a determination submodule for non-covered area and a detection submodule for skin area (not shown);

wherein the detection submodule for covered area is used to detect covered areas in the facial area; the determination submodule for non-covered area is used to determine a non-covered area in the facial area according to the covered areas; the detection submodule for skin area is used to detect the skin area in the non-covered area or to detect the skin area in the facial area.

Specifically, the image to be processed comprises:
an original image to be processed or an image obtained by scaling up/down the original image to be processed according to a first preset scale.

In a specific embodiment of the present application, the removal module for skin blemish 1004 may comprise: a mapping submodule for skin blemish and a removal submodule for skin blemish (not shown);

wherein the mapping submodule for skin blemish is used to map the skin blemishes in the skin area to be processed into the facial area of the image to be processed; the removal submodule for skin blemish is used to remove the skin blemishes in the facial area of the image to be processed according to the result of mapping to obtain a processed image.

In another specific embodiment of the present application, the removal module for skin blemish 1004 may further comprise: a scaling submodule for skin blemish (not shown);

The scaling submodule for skin blemish is used to scale up the areas where the skin blemishes are located in the image to be processed according to a preset second scale after the mapping submodule for skin blemish maps the skin blemishes in the skin area to be processed into the facial area of the image to be processed, wherein the preset second scale is greater than 1.

In another specific embodiment of the present application, the removal submodule for skin blemish may comprise: a function calculation unit, an obtainment unit for lateral and longitudinal color value, an obtainment unit for normal skin color value and a replacement unit for color value (not shown);

wherein the function calculation unit is used to calculate a lateral skin color varying function y=f(x) and a longitudinal skin color varying function y'=f(x') corresponding to a pixel located in a preset relative location in a skin blemish in the facial area of the image to be processed, wherein x represents the lateral coordinate of a pixel in the image to be processed, x' represents the longitudinal coordinate of a pixel in the image to be processed, y represents the color value corresponding to a pixel whose lateral coordinate is x, and y' represents the color value corresponding to a pixel whose longitudinal coordinate is x';

the obtainment unit for lateral and longitudinal color value is used to plug the lateral coordinate and longitudinal coordinate of each pixel in the skin blemish in the facial area of the image to be processed into the above-mentioned lateral skin color varying function and longitudinal skin color varying function respectively to obtain lateral and longitudinal color values of each pixel;

the obtainment unit for normal skin color value is used to average the lateral and longitudinal color values of each pixel, to obtain a normal skin color value corresponding to each pixel;

the replacement unit for color value is used to replace the color value of each pixel of the skin blemish in the facial area of the image to be processed with the calculated normal skin value of each pixel in order, thereby removing skin blemishes in the facial area of the image to be processed to obtain a processed image.

In another specific embodiment of the present application, the device may further comprise: a dermabrasion processing module (not shown);

wherein the dermabrasion processing module is used to perform dermabrasion processing on the processed image to obtain an image in which conspicuous effect is removed.

Specifically, the skin blemish may comprise any one or more of the blemishes below: acne, stain, scar or moles.

With the device provided by the embodiments of the present application, facial skin in an image is modified automatically, and both light-colored blemishes and obvious facial skin problems are removed. In contrast to the solutions for removing facial skin blemishes manually in various existing APPs of facial skin beautification, the device provided by the present application provides a better experience for users.

Figure 11:
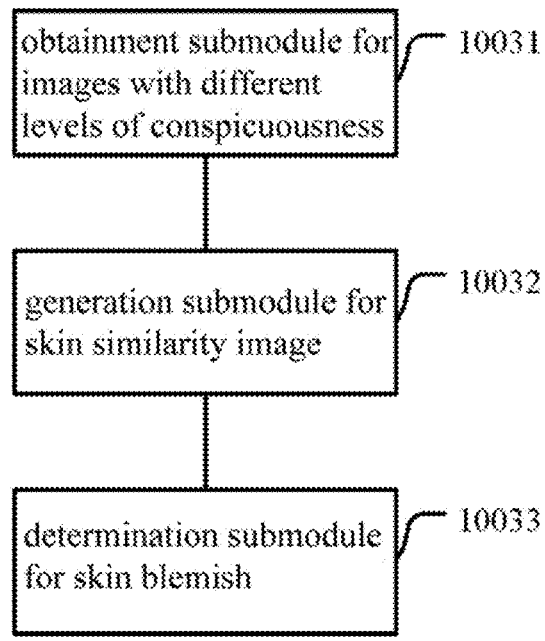
FIG. 11 is a schematic diagram of the logical structure of a determination module for skin blemish according to an embodiment of present application.

In another specific embodiment of the present application, a specific implementation of the determination module for skin blemish 1003 is provided, seen in FIG. 11. FIG. 11 is a schematic diagram of the logic structure of a determination module for skin blemish according to embodiments of the present application. The determination module for skin blemish 1003 may comprise: an obtainment submodule for images with different levels of conspicuousness 10031, a generation submodule for skin similarity image 10032 and a determination submodule for skin blemish 10033;

wherein the obtainment submodule for images with different levels of conspicuousness 10031 is used to obtain images with different levels of blemish conspicuousness for the skin area to be processed;

the generation submodule for skin similarity image 10032 is used to determine color values of the skin area to be processed and generate a skin similarity image for the skin area to be processed according to the color values;

the determination submodule for skin blemish 10033 is used to determine the locations of the skin blemishes in the skin area to be processed according to the images with different levels of blemish conspicuousness and the skin similarity image.

Specifically, the generation submodule for skin similarity image 10032 may comprise: an obtainment unit for sampling value, a calculation unit for skin color value, a similarity calculation unit and a generation unit for skin similarity image (not shown).

The obtainment unit for sampling value is used to sample the skin color value of a number of areas in the skin area to be processed respectively to obtain a number of sampling values for each area;

the calculation unit for skin color value is used to calculate a skin color value for each area according to the sampling values;

the similarity calculation unit is used to traverse pixels in each area respectively, and to calculate a similarity value between the color value of each pixel and the skin color value of the area in which the pixel is located;

the generation unit for skin similarity image is used to map the calculated similarity values into grayscale values to generate a skin similarity image reflecting skin color.

Specifically, the obtainment submodule for images with different levels of conspicuousness 10031 may comprise: a first image generation unit, a second image generation unit and a third image generation unit (not shown);

wherein the first image generation unit is used to generate a first image with a first black/white contrast;

the second image generation unit is used to generate a second image with a second black/white contrast; wherein the first black/white contrast is greater than the second black/white contrast;

the third image generation unit is used to generate a third image with a third black/white contrast; wherein the third black/white contrast is the same as the first black/white contrast;

the determination submodule for skin blemish 10033 is specifically used to determine the locations of skin blemishes in the skin area to be processed according to the first, the second and the third images as well as the skin similarity image.

In a specific embodiment of the present application, the determination submodule for skin blemish 10033 is specifically further used to determine the locations of skin blemishes in the skin area to be processed according to the first, the second and the third image, the skin similarity image and the skin area to be processed.

Specifically, the determination submodule for skin blemish 10033 may comprise: a generation unit for first set of skin blemishes, a generation unit for second set of skin blemishes, a generation unit for third and fourth set of skin blemishes, and an obtainment unit for skin blemish (not shown);

wherein the generation unit for first set of skin blemishes is used to generate a first set of skin blemishes according to the second image, the skin similarity image and the skin area to be processed;

the generation unit for second set of skin blemishes is used to generate a second set of skin blemishes according to the first image, the skin similarity image and the skin area to be processed;

the generation unit for third and fourth set of skin blemishes is used to generate a third set of skin blemishes and a fourth set of skin blemishes according to the third image, the skin similarity image and the skin area to be processed;

the obtainment unit for skin blemish is used to combine the first to fourth sets of skin blemishes together to obtain the locations of all the skin blemishes in the skin area to be processed.

Specifically, the generation unit for first set of skin blemishes may comprise: a first searching subunit, a first mapping subunit, a first extraction subunit for location and color value of patch, and a first judgment subunit for grayscale value (not shown).

The first searching subunit is used to search for a patch that meets a first search criteria in the second image; wherein the first search criteria is that grayscale values of pixels thereof are smaller than or equal to a first grayscale threshold and that the number of pixels therein, which are adjacent to each other and whose grayscale values are smaller than or equal to the first grayscale threshold, is smaller than or equal to a first adjacency threshold;

the first mapping subunit is used to map the location of the patch into the skin area to be processed and the skin similarity image;

the first extraction subunit for location and color value of patch is used to extract the location of the patch and color values of pixels corresponding to the patch from the skin area to be processed;

the first judgment subunit for grayscale value is used to extract grayscale values of the corresponding pixels within a predetermined range centered at the location of the patch from the skin similarity image, and to judge whether the grayscale values are within a grayscale threshold range representing similar skin color in the case that the color values extracted by the first extraction subunit for location and color value of patch are within a predetermined blemish color threshold range; if yes, to take one or more searched patches as the first set of skin blemishes.

Specifically, the generation unit for second set of skin blemishes may comprise: a second searching subunit, a second mapping subunit, a second extraction subunit for location and color value of patch, and a second judgment subunit for grayscale value (not shown).

The second searching subunit is used to search for a patch that meets a second search criteria in the first image; wherein the second search criteria is that grayscale values of pixels thereof are smaller than or equal to a second grayscale threshold and that the number of pixels therein, which are adjacent to each other and whose grayscale values are smaller than or equal to the second grayscale threshold, is smaller than or equal to a second adjacency threshold;

the second mapping subunit is used to map the location of the patch into the skin area to be processed and the skin similarity image;

the second extraction subunit for location and color value of patch, which is used to extract the location of the patch and color values of pixels corresponding to the patch from the skin area to be processed;

the second judgment subunit for grayscale value is used to extract grayscale values of the corresponding pixels within a predetermined range centered at the location of the patch from the skin similarity image, and to judge whether the grayscale values are within a grayscale threshold range representing similar skin color in the case that the color values extracted by the second extraction subunit for location and color value of patch are within the predetermined blemish color threshold range; if yes, to take one or more searched patches as the second set of skin blemishes.

Specifically, the generation unit for third and fourth set of skin blemishes may comprise: a third searching subunit, a fourth searching subunit, a third mapping subunit, a third extraction subunit for location and color value of patch, and a third judgment subunit for grayscale value (not shown).

The third searching subunit is used to search for a patch that meets a third search criteria in the third image; wherein the third search criteria is that grayscale values of pixels thereof are smaller than or equal to a third grayscale threshold and that the number of pixels therein, which are adjacent to each other and whose grayscale values are smaller than or equal to the third grayscale threshold, is smaller than or equal to a third adjacency threshold;

the fourth searching subunit, which is used to search for a patch that meets a fourth search criteria in the third image; wherein the fourth search criteria is that grayscale values of pixels thereof are smaller than or equal to a fourth grayscale threshold and that the number of pixels therein, which are adjacent to each other and whose grayscale values are smaller than or equal to the fourth grayscale threshold, is smaller than or equal to a fourth adjacency threshold;

the third mapping subunit is used to map the location of the patch that meets the third search criteria and the patch that meets the fourth search criteria into the skin area to be processed and the skin similarity image;

the third extraction subunit for location and color value of patch is used to extract the locations of the patches and color values of pixels corresponding to the patches from the skin area to be processed;

a third judgment subunit for grayscale value, which is used to extract grayscale values of the corresponding pixels within a predetermined range centered at the location of a patch from the skin similarity image, and to judge whether the grayscale values are within a grayscale threshold range representing similar skin color in the case that the color values are within the predetermined blemish color threshold range; if yes, to take one or more searched patches that meet the third search criteria as the third set of skin blemishes and take one or more searched patches that meet the fourth search criteria as the fourth set of skin blemishes.

In a specific embodiment of the present application, the first image generation unit is specifically used to perform a first grayscale processing on the skin area to be processed to generate a first image with a first black/white contrast;

the second image generation unit is specifically used to perform a second grayscale processing on the skin area to be processed to generate a second image with a second black/white contrast; wherein the way of the second grayscale processing is different from that of the first grayscale processing;

the third image generation unit is specifically used to perform a dermabrasion processing on the skin area to be processed to obtain a dermabrasion-processed image, and then to perform a third grayscale processing on the dermabrasion-processed image to generate a third image with a third black/white contrast; wherein the way of the third grayscale processing is identical with that of the first grayscale processing.

It can be seen from above that in this solution skin blemishes in the skin area may be detected accurately and completely by obtaining images with different levels of conspicuousness for the skin area to be processed and the skin similarity image, which provide basis for removing skin blemishes.

Furthermore, embodiments of the present application provide a terminal which comprises:

a processor, a memory, a communication interface and a bus;

the processor, the memory and the communication interface connect to and communicate with each other via the bus;

the memory stores executable program code;

the processor executes the program corresponding to the executable program code by reading the executable program code stored in the memory, so as to:

perform facial recognition on an image to be processed;

determine a skin area to be processed in a facial area according to detection results;

determine the locations of skin blemishes in the skin area to be processed;

remove the skin blemishes in the facial area according to the determined locations of the skin blemishes in the skin area to be processed to obtain a processed image.

Embodiments of the present application provide an application which is used to implement the method for image processing provided by the embodiments of the present application when being executed; wherein the method for image processing comprises:

performing facial recognition on an image to be processed;

determining a skin area to be processed in a facial area according to detection results;

determining the locations of skin blemishes in the skin area to be processed;

removing the skin blemishes in the facial area according to the determined locations of the skin blemishes in the skin area to be processed to obtain a processed image.

Embodiments of the present application provides an storage medium which is used to store an application for implementing the method for image processing provided by the embodiments of the present application when being executed; wherein the method for image processing comprises:

performing facial recognition on an image to be processed;

determining a skin area to be processed in a facial area according to detection results;

determining the locations of skin blemishes in the skin area to be processed;

removing the skin blemishes in the facial area according to the determined locations of the skin blemishes in the skin area to be processed to obtain a processed image.

Embodiments of the device are described briefly compared to embodiments of the method, because they are substantially similar to embodiments of the method, and the associated parts can be obtained by referring to the descriptions of these parts of embodiments of the method.

For simplicity, the device above is described by dividing it into various units according to functions and the units are described separately. Certainly, functions of the respective units may be implemented in one or more software and/or hardware when implementing the present application.

By way of the above descriptions of embodiments, it is clear to the persons skilled in the art that the present application may be implemented by means of software together with necessary general hardware platform. Based on such understanding, essential parts of the present application or parts that contribute to the prior art of solutions may be embodied in the form of software products, which may be stored in storage medium such as ROM/RAM, magnetic disk, optical disk or the like that comprises a number of instructions which a computer device (which may be a personal computer, a server or a network device or the like) executes to apply the method described by various embodiments or certain parts of embodiments of the present application.

It should be noted that the relationship terms herein such as "first", "second" and the like are only used to distinguish one entity or operation from another entity or operation, but are not necessarily require or imply that there is actual relationship or order between these entities or operations. Moreover, the terms "include", "comprise" or any variants thereof are intended to cover a non-exclusive inclusion, such that a process, method, article or device comprising a series of elements not only comprises those elements listed, but also comprises other elements not specifically listed or the elements intrinsic to the process, method, article, or device. Without further limitations, elements limited by the wording "comprise(s) a/an . . . " do not exclude that there are additional identical elements in the process, method, article, or device which comprises the listed elements.

Each of the embodiments in this description is described in a manner that they are associated with each other. Identical or similar parts among these various embodiments can be found with reference to each other, and each embodiment emphasizes the difference between itself and other embodiments. Particularly, the embodiments of the device are described relatively briefly compared to the embodiments of the method because they are substantially similar to the embodiments of the method, and the corresponding parts can be found with reference to the description of these parts of the embodiments of the method.

The present application is applicable in many general or dedicated computing systems or configurations, for example, personal computers, server computers, handheld devices or portable devices, tablet devices, multi-processor systems, systems based on microprocessor, set-top boxes, programmable consumer electronics, network PCs, small-sized computers, large-sized computers, distributed computing environment including any system or device described above and so on.

The descriptions above are only preferred embodiments of the present application and are not intended to limit the present application. Any modification, alternative, improvement and the like within the spirit and scope of the present application should all be included in the protection scope of the present application.

The invention claimed is:

1. A method performed by a device for image processing, characterized in that the device comprising a processor, the processor executing the steps of:

performing facial recognition on an image to be processed;

determining a skin area to be processed in a facial area according to detection results;
determining the locations of skin blemishes in the skin area to be processed;
removing the skin blemishes in the facial area according to the determined locations of the skin blemishes in the skin area to be processed to obtain a processed image;
said determining the locations of skin blemishes in the skin area to be processed comprises:
obtaining images with different levels of blemish conspicuousness for the skin area to be processed;
determining color values of the skin area to be processed and generating a skin similarity image for the skin area to be processed according to the color values;
determining the locations of the skin blemishes in the skin area to be processed according to the images with different levels of blemish conspicuousness and the skin similarity image;
said obtaining images with different levels of blemish conspicuousness for the skin area to be processed comprises:
performing a first grayscale processing on the skin area to be processed to generate a first image with a first black/white contrast;
performing a second grayscale processing on the skin area to be processed to generate a second image with a second black/white contrast; wherein the first black/white contrast is greater than the second black/white contrast, and the way of the second grayscale processing is different from that of the first grayscale processing;
performing a dermabrasion processing on the skin area to be processed to obtain a dermabrasion-processed image, and then performing a third grayscale processing on the dermabrasion-processed image to generate a third image with a third black/white contrast; wherein the third black/white contrast is the same as the first black/white contrast, and the way of the third grayscale processing is identical with that of the first grayscale processing;
said determining the locations of the skin blemishes in the skin area to be processed according to the images with different levels of blemish conspicuousness and the skin similarity image comprises:
generating a first set of skin blemishes according to the second image, the skin similarity image and the skin area to be processed;
generating a second set of skin blemishes according to the first image, the skin similarity image and the skin area to be processed;
generating a third set of skin blemishes and a fourth set of skin blemishes according to the third image, the skin similarity image and the skin area to be processed;
combining the first to fourth sets of skin blemishes together to obtain the locations of all the skin blemishes in the skin area to be processed.

2. The method according to claim 1, characterized in that said determining a skin area to be processed in a facial area comprises:
detecting covered areas in the facial area;
determining a non-covered area in the facial area according to the covered areas;
detecting the skin area in the non-covered area;
or
detecting the skin area in the facial area.

3. The method according to claim 1, characterized in that said determining color values of the skin area to be processed and generating a skin similarity image of the skin area to be processed according to the color values comprises:
sampling the skin color value of a number of areas in the skin area to be processed respectively to obtain a number of sampling values for each area;
calculating a skin color value for each area according to the sampling values;
traversing pixels in each area respectively, and calculating a similarity value between the color value of each pixel and the skin color value of the area in which the pixel is located;
mapping the calculated similarity values into grayscale values to generate a skin similarity image reflecting skin color.

4. The method according to claim 1, characterized in that the step of generating a first set of skin blemishes according to the second image, the skin similarity image and the skin area to be processed comprises:
searching for a patch that meets a first search criteria in the second image; wherein the first search criteria is that grayscale values of pixels thereof are smaller than or equal to a first grayscale threshold and that the number of pixels therein, which are adjacent to each other and whose grayscale values are smaller than or equal to the first grayscale threshold, is smaller than or equal to a first adjacency threshold;
mapping the location of the patch into the skin area to be processed and the skin similarity image;
extracting the location of the patch and color values of pixels corresponding to the patch from the skin area to be processed; if the color values are within a predetermined blemish color threshold range; then
extracting grayscale values of the corresponding pixels within a predetermined range centered at the location of the patch from the skin similarity image, and judging whether the grayscale values are within a grayscale threshold range representing similar skin color;
if yes, taking one or more searched patches as the first set of skin blemishes;
the step of generating a second set of skin blemishes according to the first image, the skin similarity image and the skin area to be processed comprises:
searching for a patch that meets a second search criteria in the first image; wherein the second search criteria is that grayscale values of pixels thereof are smaller than or equal to a second grayscale threshold and that the number of pixels therein, which are adjacent to each other and whose grayscale values are smaller than or equal to the second grayscale threshold, is smaller than or equal to a second adjacency threshold;
mapping the location of the patch into the skin area to be processed and the skin similarity image;
extracting the location of the patch and color values of pixels corresponding to the patch from the skin area to be processed; if the color values are within a predetermined blemish color threshold range; then
extracting grayscale values of the corresponding pixels within a predetermined range centered at the location of the patch from the skin similarity image, and judging whether the grayscale values are within a grayscale threshold range representing similar skin color;
if yes, taking one or more searched patches as the second set of skin blemishes;

the step of generating a third set of skin blemishes and a fourth set of skin blemishes according to the third image, the skin similarity image and the skin area to be processed comprises:

searching for a patch that meets a third search criteria in the third image; wherein the third search criteria is that grayscale values of pixels thereof are smaller than or equal to a third grayscale threshold and that the number of pixels therein, which are adjacent to each other and whose grayscale values are smaller than or equal to the third grayscale threshold, is smaller than or equal to a third adjacency threshold;

searching for a patch that meets a fourth search criteria in the third image; wherein the fourth search criteria is that grayscale values of pixels thereof are smaller than or equal to a fourth grayscale threshold and that the number of pixels therein, which are adjacent to each other and whose grayscale values are smaller than or equal to the fourth grayscale threshold, is smaller than or equal to a fourth adjacency threshold;

mapping the location of the patch that meets the third search criteria and the patch that meets the fourth search criteria into the skin area to be processed and the skin similarity image;

extracting the locations of the patches and color values of pixels corresponding to the patches from the skin area to be processed; if the color values are within a predetermined blemish color threshold range; then extracting grayscale values of the corresponding pixels within a predetermined range centered at the location of a patch from the skin similarity image, and judging whether the grayscale values are within a grayscale threshold range representing similar skin color;

If yes, taking one or more searched patches that meet the third search criteria as the third set of skin blemishes, and taking one or more searched patches that meet the fourth search criteria as the fourth set of skin blemishes.

5. The method according to claim 1, characterized in that said removing the skin blemishes in the facial area according to the determined locations of the skin blemishes in the skin area to be processed to obtain a processed image comprises:

mapping the skin blemishes in the skin area to be processed into the facial area of the image to be processed;

removing the skin blemishes in the facial area of the image to be processed according to the result of mapping to obtain a processed image.

6. The method according to claim 5, characterized in that after mapping the skin blemishes in the skin area to be processed into the facial area of the image to be processed, the method further comprises:

scaling up the areas where the skin blemishes are located in the image to be processed according to a preset second scale, wherein the preset second scale is greater than 1.

7. The method according to claim 5, characterized in said removing the skin blemishes in the facial area of the image to be processed according to the result of mapping comprises:

calculating a lateral skin color varying function y=f(x) and a longitudinal skin color varying function y'=f(x') corresponding to a pixel located in a preset relative location in a skin blemish in the facial area of the image to be processed, wherein x represents the lateral coordinate of a pixel in the image to be processed, x' represents the longitudinal coordinate of a pixel in the image to be processed, y represents the color value corresponding to a pixel whose lateral coordinate is x, and y' represents the color value corresponding to a pixel whose longitudinal coordinate is x;

plugging the lateral coordinate and longitudinal coordinate of each pixel in the skin blemish in the facial area of the image to be processed into the above-mentioned lateral skin color varying function and longitudinal skin color varying function respectively to obtain lateral and longitudinal color values of each pixel;

averaging the lateral and longitudinal color values of each pixel, to obtain a normal skin color value corresponding to each pixel;

replacing the color value of each pixel of the skin blemish in the facial area of the image to be processed with the calculated normal skin value of each pixel in order, thereby removing skin blemishes in the facial area of the image to be processed to obtain a processed image.

8. The method according to claim 1, characterized in that, the method further comprises performing dermabrasion processing on the processed image to obtain an image in which conspicuous effect is removed.

9. A device for image processing, characterized in that, the device comprises:

a processor and a memory, wherein a plurality of executable modules including a facial recognition module, a determination module for skin area, a determination module for skin blemish and a removal module for skin blemish are stored in the memory, which are executable by the processor to process an image; wherein, the facial recognition module which is executed to perform facial recognition on the image to be processed;

the determination module for skin area, which is executed to determine a skin area to be processed in a facial area according to detection results;

the determination module for skin blemish, which is executed to determine the locations of skin blemishes in the skin area to be processed;

the removal module for skin blemish, which is executed to remove the skin blemishes in the facial area according to the determined locations of the skin blemishes in the skin area to be processed to obtain a processed image;

the determination module for skin blemish comprises:

an obtainment submodule for images with different levels of conspicuousness, which is executed to obtain images with different levels of blemish conspicuousness for the skin area to be processed;

a generation submodule for skin similarity image, which is executed to determine color values of the skin area to be processed and generate a skin similarity image for the skin area to be processed according to the color values;

a determination submodule for skin blemish, which is executed to determine the locations of the skin blemishes in the skin area to be processed according to the images with different levels of blemish conspicuousness and the skin similarity image;

the obtainment submodule for images with different levels of conspicuousness comprises:

a first image generation unit, which is executed to perform a first grayscale processing on the skin area to be processed to generate a first image with a first black/white contrast;

a second image generation unit, which is executed to perform a second grayscale processing on the skin area to be processed to generate a second image with a second black/white contrast wherein the first black/white contrast is greater than the second black/white contrast, and the way of the second grayscale processing is different from that of the first grayscale processing;

a third image generation unit, which is executed to firstly perform a dermabrasion processing on the skin area to be processed to obtain a dermabrasion-processed image, and then to perform a third grayscale processing to the dermabrasion-processed image to generate a third image with a third black/white contrast wherein the third black/white contrast is the same as the first black/white contrast, and the way of the third grayscale processing is identical with that of the first grayscale processing;

the determination submodule for skin blemish comprises:

a generation unit for first set of skin blemishes, which is executed to generate a first set of skin blemishes according to the second image, the skin similarity image and the skin area to be processed;

a generation unit for second set of skin blemishes, which is executed to generate a second set of skin blemishes according to the first image, the skin similarity image and the skin area to be processed;

a generation unit for third and fourth set of skin blemishes, which is executed to generate a third set of skin blemishes and a fourth set of skin blemishes according to the third image, the skin similarity image and the skin area to be processed;

an obtainment unit for skin blemish, which is executed to combine the first to fourth sets of skin blemishes together to obtain the locations of all the skin blemishes in the skin area to be processed.

10. The device according to claim 9, characterized in that the determination module for skin area comprises:

a detection submodule for covered area, which is executed to detect covered areas in the facial area;

a determination submodule for non-covered area, which is executed to determine a non-covered area in the facial area according to the covered areas;

a detection submodule for skin area, which is executed to detect the skin area in the non-covered area or detect the skin area in the facial area.

11. The device according to claim 9, characterized in that the generation submodule for skin similarity image comprises:

an obtainment unit for sampling value, which is executed to sample the skin color value of a number of areas in the skin area to be processed respectively to obtain a number of sampling values for each area;

a calculation unit for skin color value, which is executed to calculate a skin color value for each area according to the sampling values;

a similarity calculation unit, which is executed to traverse pixels in each area respectively, and to calculate a similarity value between the color value of each pixel and the skin color value of the area in which the pixel is located;

a generation unit for skin similarity image, which is executed to map the calculated similarity values into grayscale values to generate a skin similarity image reflecting skin color.

12. The device according to claim 9, characterized in that the generation unit for first set of skin blemishes comprises:

a first searching subunit, which is executed to search for a patch that meets a first search criteria in the second image; wherein the first search criteria is that grayscale values of pixels thereof are smaller than or equal to a first grayscale threshold and that the number of pixels therein, which are adjacent to each other and whose grayscale values are smaller than or equal to the first grayscale threshold, is smaller than or equal to a first adjacency threshold;

a first mapping subunit, which is executed to map the location of the patch into the skin area to be processed and the skin similarity image;

a first extraction subunit for location and color value of patch, which is executed to extract the location of the patch and color values of pixels corresponding to the patch from the skin area to be processed;

a first judgment subunit for grayscale value, which is executed to extract grayscale values of the corresponding pixels within a predetermined range centered at the location of the patch from the skin similarity image, and to judge whether the grayscale values are within a grayscale threshold range representing similar skin color in the case that the color values extracted by the first extraction subunit for location and color value of patch are within a predetermined blemish color threshold range; if yes, to take one or more searched patches as the first set of skin blemishes;

the generation unit for second set of skin blemishes comprises:

a second searching subunit, which is executed to search for a patch that meets a second search criteria in the first image; wherein the second search criteria is that grayscale values of pixels thereof are smaller than or equal to a second grayscale threshold and that the number of pixels therein, which are adjacent to each other and whose grayscale values are smaller than or equal to the second grayscale threshold, is smaller than or equal to a second adjacency threshold;

a second mapping subunit, which is executed to map the location of the patch into the skin area to be processed and the skin similarity image;

a second extraction subunit for location and color value of patch, which is executed to extract the location of the patch and color values of pixels corresponding to the patch from the skin area to be processed;

a second judgment subunit for grayscale value, which is executed to extract grayscale values of the corresponding pixels within a predetermined range centered at the location of the patch from the skin similarity image, and to judge whether the grayscale values are within a grayscale threshold range representing similar skin color in the case that the color values extracted by the second extraction subunit for location and color value of patch are within the predetermined blemish color threshold range; if yes, to take one or more searched patches as the second set of skin blemishes;

the generation unit for third and fourth set of skin blemishes comprises:

a third searching subunit, which is executed to search for a patch that meets a third search criteria in the third image; wherein the third search criteria is that grayscale values of pixels thereof are smaller than or equal to a third grayscale threshold and that the number of pixels therein, which are adjacent to each other and whose grayscale values are smaller than or equal to the third grayscale threshold, is smaller than or equal to a third adjacency threshold;

a fourth searching subunit, which is executed to search for a patch that meets a fourth search criteria in the third image; wherein the fourth search criteria is that grayscale values of pixels thereof are smaller than or equal to a fourth grayscale threshold and that the number of pixels therein, which are adjacent to each other and whose grayscale values are smaller than or equal to the fourth grayscale threshold, is smaller than or equal to a fourth adjacency threshold;

a third mapping subunit, which is executed to map the location of the patch that meets the third search criteria and the patch that meets the fourth search criteria into the skin area to be processed and the skin similarity image;

a third extraction subunit for location and color value of patch, which is executed to extract the locations of the patches and color values of pixels corresponding to the patches from the skin area to be processed;

a third judgment subunit for grayscale value, which is executed to extract grayscale values of the corresponding pixels within a predetermined range centered at the location of a patch from the skin similarity image, and to judge whether the grayscale values are within a grayscale threshold range representing similar skin color in the case that the color values are within the predetermined blemish color threshold range; if yes, to take one or more searched patches that meet the third search criteria as the third set of skin blemishes and take one or more searched patches that meet the fourth search criteria as the fourth set of skin blemishes.

13. The device according to claim 9, characterized in that the removal module for skin blemish comprises:

a mapping submodule for skin blemish, which is executed to map the skin blemishes in the skin area to be processed into the facial area of the image to be processed;

a removal submodule for skin blemish, which is executed to remove the skin blemishes in the facial area of the image to be processed according to the result of mapping to obtain a processed image.

14. The device according to claim 13, characterized in that the removal module for skin blemish further comprises:

a scaling submodule for skin blemish, which is executed to scale up the areas where the skin blemishes are located in the image to be processed according to a preset second scale after the mapping submodule for skin blemish maps the skin blemishes in the skin area to be processed into the facial area of the image to be processed, wherein the preset second scale is greater than 1.

15. The device according to claim 13, characterized in that the removal submodule for skin blemish comprises:

a function calculation unit, which is executed to calculate a lateral skin color varying function $y=f(x)$ and a longitudinal skin color varying function $y'=f(x')$ corresponding to a pixel located in a preset relative location in a skin blemish in the facial area of the image to be processed, wherein x represents the lateral coordinate of a pixel in the image to be processed, x' represents the longitudinal coordinate of a pixel in the image to be processed, y represents the color value corresponding to a pixel whose lateral coordinate is x, and y' represents the color value corresponding to a pixel whose longitudinal coordinate is x';

an obtainment unit for lateral and longitudinal color value, which is executed to plug the lateral coordinate and longitudinal coordinate of each pixel in the skin blemish in the facial area of the image to be processed into the above-mentioned lateral skin color varying function and longitudinal skin color varying function respectively to obtain lateral and longitudinal color values of each pixel;

an obtainment unit for normal skin color value, which is executed to average the lateral and longitudinal color values of each pixel, to obtain a normal skin color value corresponding to each pixel;

a replacement unit for color value, which is executed to replace the color value of each pixel of the skin blemish in the facial area of the image to be processed with the calculated normal skin value of each pixel in order, thereby removing skin blemishes in the facial area of the image to be processed to obtain a processed image.

16. The device according to claim 9, characterized in that the device further comprises a dermabrasion processing module;

the dermabrasion processing module is executed to perform dermabrasion processing on the processed image to obtain an image in which conspicuous effect is removed.

* * * * *